United States Patent
Kaplan

(10) Patent No.: US 10,288,103 B2
(45) Date of Patent: May 14, 2019

(54) FURNITURE CONNECTOR

(71) Applicant: Lakeshore Equipment Company, Carson, CA (US)

(72) Inventor: Joshua Kaplan, Hermosa Beach, CA (US)

(73) Assignee: Lakeshore Equipment Company, Carson, CA (US)

( * ) Notice: Subject to any disclaimer, the term of this patent is extended or adjusted under 35 U.S.C. 154(b) by 484 days.

(21) Appl. No.: 14/954,872

(22) Filed: Nov. 30, 2015

(65) Prior Publication Data
US 2017/0152878 A1   Jun. 1, 2017

(51) Int. Cl.
| | |
|---|---|
| F16B 12/10 | (2006.01) |
| F16B 12/20 | (2006.01) |
| F16B 12/22 | (2006.01) |
| F16B 12/00 | (2006.01) |
| E05D 5/10 | (2006.01) |

(52) U.S. Cl.
CPC .............. *F16B 12/10* (2013.01); *F16B 12/00* (2013.01); *F16B 12/20* (2013.01); *F16B 12/22* (2013.01); *E05D 2005/106* (2013.01); *E05Y 2900/142* (2013.01); *E05Y 2900/20* (2013.01)

(58) Field of Classification Search
CPC ............... E05D 5/12; E05D 2005/102; E05D 2005/106; E05D 2011/1035; E05D 2011/1092; E05D 11/1028; E05D 11/1007; F16B 12/20; F16B 12/22; F16B 12/24; F16C 11/045
See application file for complete search history.

(56) References Cited

U.S. PATENT DOCUMENTS

| | | | | |
|---|---|---|---|---|
| 3,744,085 A | * | 7/1973 | Griego | ................. E05D 11/1007 16/325 |
| 4,601,145 A | | 7/1986 | Wilcox | |
| 4,638,614 A | | 1/1987 | Wilcox | |
| 4,683,613 A | * | 8/1987 | Starke | ................... E05D 7/1016 16/262 |
| 4,844,519 A | * | 7/1989 | Dagon | ................... E05B 37/20 16/266 |

(Continued)

FOREIGN PATENT DOCUMENTS

| | | |
|---|---|---|
| DE | 3427397 A1 | 2/1986 |
| DE | 9109828 U1 | 2/1992 |

(Continued)

*Primary Examiner* — Matthew R McMahon
(74) *Attorney, Agent, or Firm* — Banner & Witcoff, Ltd.

(57) ABSTRACT

A furniture connector connects two or more pieces of furniture together or may connect furniture to a wall, embodied, for example, as an adjustable room partition or modular storage unit. The furniture connector has a first spoke and a second spoke, which may be connected to a furniture piece or wall via respective locking mechanisms. The first and second spokes are joined by a pin, along a longitudinal axis of the pin. The connector allows the positions of two attached furniture pieces (or a furniture piece and a wall) to be adjusted about the longitudinal axis at a variety of discrete angles; once set to a desired angle, the connector limits the relative rotational movement of the first spoke and second spoke (about the longitudinal axis.) Other embodiments are also described and claimed.

20 Claims, 7 Drawing Sheets

(56) References Cited

U.S. PATENT DOCUMENTS

| | | | | |
|---|---|---|---|---|
| 5,007,666 A * | 4/1991 | Kyfes | ................... | B29C 65/58 |
| | | | | 138/162 |
| 5,074,164 A * | 12/1991 | Sheu | ................... | E05D 11/1007 |
| | | | | 16/349 |
| 5,544,870 A | 8/1996 | Kelley et al. | | |
| 5,586,594 A | 12/1996 | Shapoff | | |
| 6,295,764 B1 | 10/2001 | Berridge et al. | | |
| 6,619,008 B1 | 9/2003 | Shivak et al. | | |
| 6,955,204 B1 | 10/2005 | Gilbert et al. | | |
| 6,974,324 B1 | 12/2005 | Gregoire et al. | | |
| 7,000,290 B1 * | 2/2006 | Ace | ........................ | E05D 5/10 |
| | | | | 16/229 |
| 7,128,493 B2 * | 10/2006 | Alarcon-Lopez | ....... | F16B 12/20 |
| | | | | 403/322.1 |
| 7,891,055 B1 * | 2/2011 | Combs | ................... | E05D 11/084 |
| | | | | 16/341 |
| 8,112,834 B1 * | 2/2012 | Shamie | ................... | A47D 9/00 |
| | | | | 5/207 |
| 8,245,353 B2 * | 8/2012 | Homner | ................ | E05F 1/1215 |
| | | | | 16/298 |
| 8,307,513 B1 * | 11/2012 | Fitzgerald | ............... | E05D 11/06 |
| | | | | 16/344 |
| 9,483,083 B1 * | 11/2016 | Zaloom | ................. | G06F 1/1679 |
| 9,506,281 B1 * | 11/2016 | Zaloom | ............... | E05D 11/1028 |
| 9,617,771 B2 * | 4/2017 | Gill | ........................... | E04G 5/14 |
| 2005/0081332 A1 | 4/2005 | Franchini | | |
| 2008/0141495 A1 * | 6/2008 | Fisher | ................. | A63H 33/008 |
| | | | | 16/343 |
| 2011/0260592 A1 * | 10/2011 | Lin | ...................... | A47B 47/042 |
| | | | | 312/265.5 |
| 2018/0017091 A1 * | 1/2018 | Schon | .................... | F16B 12/22 |

FOREIGN PATENT DOCUMENTS

| | | |
|---|---|---|
| EP | 1672155 A1 | 6/2006 |
| GB | 2267722 A | 12/1993 |
| GB | 2393480 A | 3/2004 |

* cited by examiner

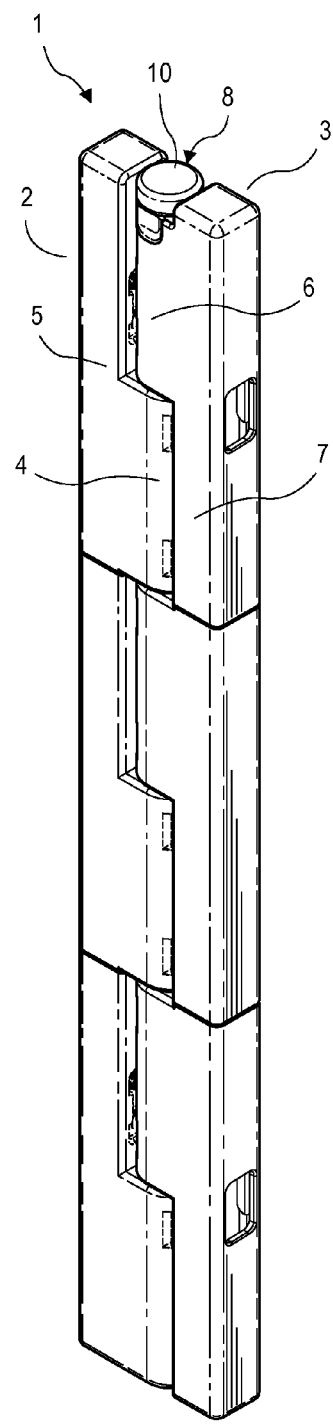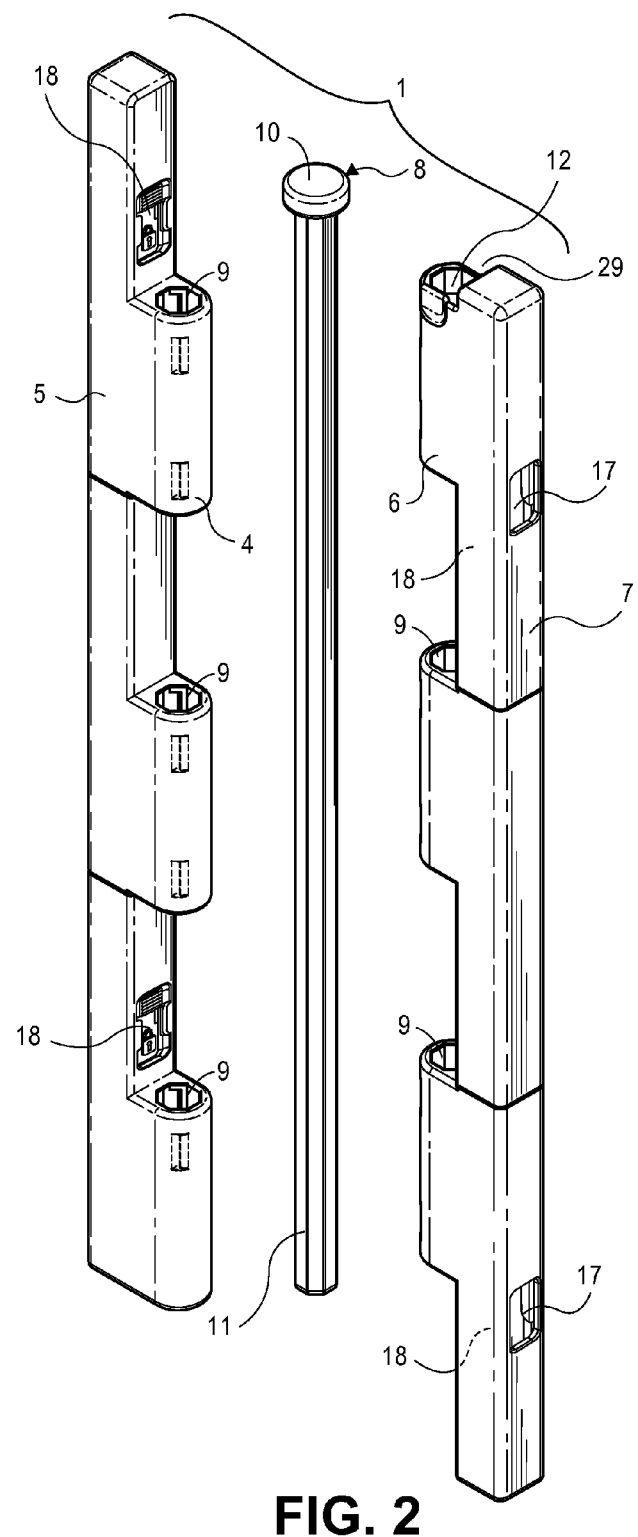
FIG. 1
FIG. 2

FURNITURE CONNECTOR

FIELD

An embodiment of the invention relates to a furniture connector that can be used to mechanically attach two pieces of furniture, such as walls or partitions or other items of furniture. Other embodiments are also disclosed.

BACKGROUND

A room divider typically has several segments that are attached to each other to suit a particular arrangement. Two segments can be detached and re-attached into a different configuration. Typically, this requires the use of tools to remove some nuts or bolts or brackets, rearrange adjacent segments into a different arrangement, and then reinstall the brackets (along with the nuts and/or bolts) to fix the segments in their new position.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIG. 1 shows a perspective view of a furniture connector that is in a vertical orientation, according to one embodiment.

FIG. 2 shows an exploded view of the embodiment of FIG. 1.

DETAILED DESCRIPTION

Figure 3:
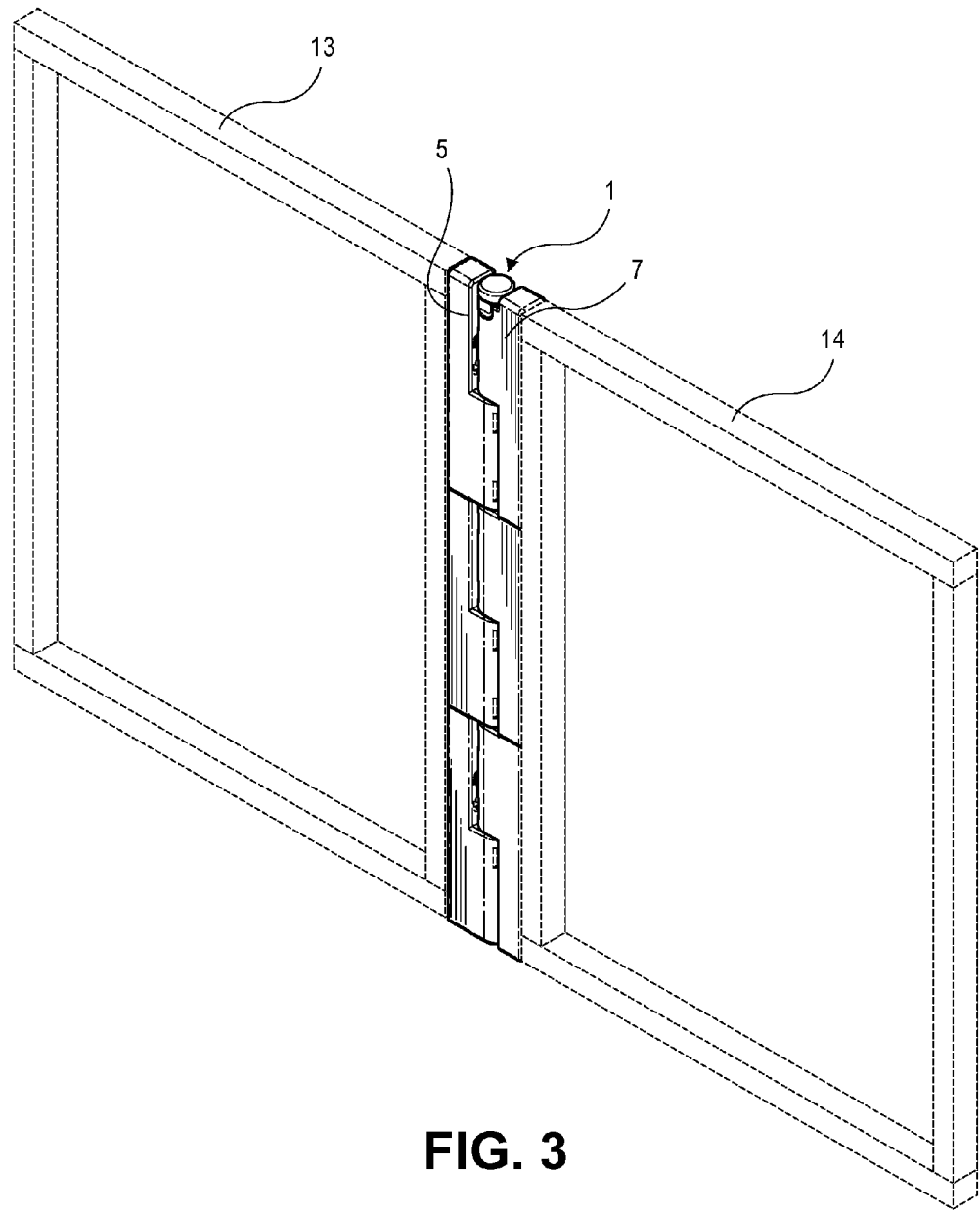
FIG. 3 shows a perspective view of the embodiment of FIG. 1 in a room divider or partition, set to an angle of 180 degrees.

Several embodiments described with reference to the appended drawings are now explained. While numerous details are set forth, it is understood that some embodiments of the invention may be practiced without these details. In other instances, well-known structures and techniques have not been shown in detail so as not to obscure the understanding of this description.

FIG. 1 and FIG. 2 each show an embodiment of the invention as a furniture connector 1 that connects two or more pieces of furniture together. The furniture connector 1 and the furniture pieces may be embodied as, for example, a room divider or partition that can be freestanding on a floor, may be attached to a wall, and may be used to divide a room into one or more regions to be used by children. The furniture connector 1 may also be embodied as a part of a modular storage unit, such as a multi-segmented book case, locker, or shelf, or embodied as part of affixing such pieces of furniture to a wall or room divider. Other furniture pieces that need to be mechanically attached to each other can benefit from use of the connector 1. The furniture connector 1 has a first spoke 2 that is to be connected to a furniture piece or wall, and a second spoke 3 that is to be connected to another furniture piece or wall. The first spoke 2 and the second spoke 3 are joined to each other by an elongated pin 8, along a longitudinal axis of the pin 8. The pin 8 may have a pinhead 10 and a shaft 11 that extends longitudinally, e.g., straight, from the pinhead 10. The pin 8 may act as a hub for the spokes 2, 3, when it has been inserted through the spokes 2, 3 into its position as shown in FIG. 1.

The furniture connector 1 allows the relative orientation of two furniture pieces to be easily re-adjusted, about a longitudinal axis of the pin 8 by, for example, removing the pin 8 from all of the first and second spokes 2, 3 (or alternatively the pin could remain only within the topmost second spoke 3), changing the relative angle of the first and second spokes 2, 3, and reinserting the pin, without the need for any tools. The relative orientation of the furniture pieces can take on any one of several discrete, predetermined angles. The furniture connector 1, once set to a specific desired one of the discrete angles, limits the relative rotational movement of the first spoke 2 and second spoke 3 about its longitudinal axis. In one embodiment, the relative rotational movement that is allowed, at a specific discrete angle position, may be only due to the inherent "play" that is present in the joint formed between the first spoke 2 and second spoke 3. This play may be governed by the gap between the keyed surface of the shaft 11 (of the pin 8), the adjoining keyed inner surface of a barrel portion 4 of the first spoke 2, and the adjoining keyed inner surface of a barrel portion 6 of the second spoke 3, as described below. Once the first spoke 2 and the second spoke 3 are joined by the pin 8, the spokes 2, 3 cannot move sideways relative to each other (other than an amount that is due to the tolerance in the dimensions of the keyed surfaces of the barrel portions 4, 6), and also cannot pivot or rotate relative to each other (beyond the above-mentioned play.)

FIG. 1 shows a perspective view of the furniture connector 1, while FIG. 2 shows an exploded view thereof. The furniture connector 1 has three first spokes 2 that are stacked as shown to form a bank, and three second spokes 3 that are also stacked to form a bank as shown. Each first spoke 2 may have a first spoke barrel portion 4 that is joined to and extends from a lower portion of a first spoke support member 5, thereby effectively leaving a gap that is adjacent to it and in front of the upper portion of the first spoke support member 5. As explained below and as shown in FIG. 1, this gap is filled, at least partially, if not entirely, by a barrel portion 6 of the second spoke 3.

The three first spokes 2 are stacked on top of each other and attached to each other at their respective first spoke support members 5 in such a way that their respective barrel portions 4 are aligned end to end (rather than side by side), so that the pin 8 can pass through all of the barrel portions 4 as seen in the assembled view of FIG. 1. There may be any number of first spokes 2 connected to each other in this manner to form a bank, in which a sequence of barrel portions 4 (in this case, three) are separated by gaps, as best illustrated in the exploded view of FIG. 2. In one embodiment, there may be two to ten first spokes 2. One first spoke 2 may be attached to another first spoke 2, at their respective first spoke support members 5, by glue, snapping mechanism, screws, sonic welding and the like. In the embodiment shown, there is a top first spoke 2, only one, middle first spoke 2, and a bottom first spoke 2.

A configuration similar to the first spoke 2 is possible for the second spoke 3. The second spoke 3 may have a second spoke barrel portion 6 that is joined to and extends laterally from an upper portion of a second spoke support member 7, thereby effectively leaving a gap that is adjacent to it and in front of a lower portion of the second spoke support member 7, as best seen in the exploded view of FIG. 2. This gap is filled, at least partially, if not entirely, by the barrel portion 4 of the second spoke 2, as seen in the assembled view of FIG. 1.

One or more second spokes 3 may be stacked on top of each other and attached to each other as shown so that their barrel portions 6 are aligned end to end (rather than side by side), such that the pin 8 can pass through all of the barrel portions 6. There may be any number of second spokes 3 connected to each other. In one embodiment, there may be two to ten second spokes 3. One second spoke 3 may be attached to another second spoke 3 at their respective second spoke support members 7, by glue, snapping mechanism, screws, sonic welding and the like. In the embodiment shown, there is a top second spoke 3, one middle second spoke 3, and a bottom second spoke 3. Although FIGS. 1 and 2 show the connector 1 as having three first spokes 2 and three second spokes 3, in other embodiments there may a different number of second spokes 3 (that are joined to each other as one bank) than first spokes 2 (that are joined to each other as another bank.)

The first spoke 2 may be manufactured as follows. Its barrel portion 4 may be integrated with its respective support member 5, e.g., as part of an injection molded, plastic half-shell. The two half shells may be snap-fit, glued, screwed, or sonic welded together to form the spoke 2. Alternatively, the barrel portion 4 and the support member 5 may be formed as separate pieces that are then attached to each other, to form the first spoke 2. It may be that the barrel portion 4 is integrated or attached to its respective support member 5, lengthwise. In one embodiment (as shown), the length of each barrel portion 4 is approximately one half of the length of its support member 5. In another embodiment, the length of a barrel portion 4 is less than half of the length of its support member 5. The barrel portion 4 may be rounded in shape on its outside (again as best seen in FIG. 2), which is opposite to the side that is integrated with or attached to its respective support member 5. This description of how the first spoke 2 may be formed is also applicable to forming the second spoke 3, including integration of its barrel portion 6 with its respective support member 7.

FIGS. 1, 2 also illustrate another embodiment of the invention, where the bank of second spokes 3 has a feature that can be used to distinguish between the top and the bottom of the connector 1. As best seen in FIG. 2, a notched portion 29 is formed on a top end of the second spoke barrel portion 6 of the top, second spoke 3. This notched portion 29 may have the same or similar height as the height of the pinhead 10 of the pin 8. This allows the top, second spoke 3 to accommodate the pinhead 10 of the pin 8 within the notched portion 29 once the pin 8 has been inserted into its position as shown in FIG. 1, so that the pinhead 10 is essentially flush with the top end of the top, first spoke 2 and the top end of the top, second spoke 3. In this manner, and as seen in FIG. 1, there is a clear visual indicator between the top of the connector 1, where the first and second spokes 2, 3 are interrupted by the pinhead 10 (which is also flush with the top end of the connector 1), and the bottom of the connector 1 where the first and second spokes 2, 3 are abutting (not interrupted). A user can easily grasp the pinhead 10 at the top of the connector 1, and then pulls the pin 8 upwards while the bottom of the connector 1 (and the bottom of the attached furniture pieces) can remain resting against a floor or other base.

Although the examples in the drawings here show a symmetrical connector, which has three, first spokes 2 and three, second spokes 3 all of which are of the same length, an asymmetric version is possible. For example, the number of first spokes 2 in one bank need not be equal to the number of second spokes 3 in another bank. Also, the length of the first spoke 2 need not be equal to the length of the second spoke 3, and there may be two first spokes 2 in the same bank that have different lengths, and/or two second spokes 3 in the other bank that have different lengths. While for aesthetic reasons the total length of each bank may be the same, such as shown in the example of FIG. 1, an alternative is to have one bank that is longer (in total length) than the other bank (due to for example a missing spoke, or having a spoke that is longer than all of the others.)

FIG. 2 shows an exploded view of furniture connector 1 having first spokes 2, second spokes 3, and the pin 8. The pin 8 joins the first spokes 2 to the second spokes 3 as it extends through the pin openings 9 that are formed in the barrel portions 4, and through the pin openings 9 that are formed in the barrel portions 6. Each pin opening 9 is surrounded by or defined by a keyed, inner surface 12 of the barrel portion 4, 6 in which it is formed. With the pin 8 so inserted, the first spoke barrel portion 4 is kept below the second spoke barrel portion 6 while the barrel portions 4, 6 are aligned end to end with each other along the longitudinal axis of the pin 8. To achieve such a state, the pinhead 10 may be grasped by a user's hand, and the user then rotates the pin 8 until the keyed surface of its shaft 11 becomes aligned with the keyed inner surface 12 of the barrel portion 6, at the top of the connector 1; then, the pin 8 is pushed into the barrel portion 6 through the respective pin opening 9. Note that if the keyed surface of the shaft 11 is not aligned with that of the inner surface 12 of the barrel portion 6, the pin 8 cannot pass into the pin opening 9 at the top end of the barrel portion 6 (due to the keyed bottom end of the shaft 11 interfering with the top end of the barrel portion 6 as defined by the inner surface 12.)

With the pin 8 being partially inside the barrel portion 6, and the user having positioned the barrel portion 4 of the first spoke 2 directly underneath (and vertical) with the barrel portion 6, the user may turn the first spoke 2 to a desired one of the predetermined angles relative to the second spoke 3, at which point the keyed inner surface 12 in the barrel portion 4 becomes aligned with the keyed inner surface 12 in the barrel portion 6. At this point, the user can now continue pushing the pin 8, through the barrel portion 6 and then into the pin opening 9 of the barrel portion 4. The first and second spokes 2, 3 are now joined (by the pin 8.) The pinhead 10 may now act as a stop against the top of the uppermost second spoke 3, to prevent the pin 8 from being pushed all of the way through (and then out of) the spokes 2, 3. To detach the first and second spokes 2, 3 from each other, the pinhead 10 may be grasped by the user and then pulled out of the barrel portion 4 while preferably holding the spokes 2, 3 still; this may be essentially a reverse of the pin insertion process.

As shown in the example of FIG. 1, the furniture connector 1 has three first spokes 2 and three second spokes 3 arranged so that the three, first spoke barrel portions 4 and the three, second spoke barrel portions 6 are alternately positioned along the longitudinal axis of the pin 8, with the pin openings 9 and the keyed inside surfaces of each barrel portion 4, 6 being properly aligned. As mentioned above, before the pin 8 can be inserted into the pin openings 9, the first spokes 2 and the second spokes 3 are rotated relative to each other, to a desired angle between each other, while the barrel portions 4, 6 and pin openings 9 are maintained along the longitudinal axis. Once a desired angle is reached, the pin 8 is inserted into the pin openings 9 of the second spoke barrel portions 6 and the first spoke barrel portions 4 (consecutively, in the order as shown).

Also as mentioned above, once the pin 8 is inserted into the pin openings 9, the relative rotational movement between the first spokes 2 and the second spokes 3, about the longitudinal axis of the pin 8, is limited. This is because the shaft 11 of the pin 8 and the pin openings 9 (or the inside surfaces of the barrel portions 4, 6) are keyed to complement each other. As depicted in FIG. 2, each of the pin openings 9 (of the barrel portions 4, 6) may be defined by the inner surface 12 that is keyed to match the shaft 11, so that the shaft 11 can only be inserted through the barrel portion 4, 6 at a discrete number of radial angles about its longitudinal axis, one at a time. In one embodiment, the contour of the shaft 11 (along a horizontal plane, and forming a closed loop around its longitudinal axis) conforms to the contour of the inner surface 12 of the barrel portions 4, 6 (along the horizontal plane). The contours of the inner surfaces 12 in each of the barrel portions 4, 6 should be the same, enabling the shaft 11 (which is deemed to be "straight" in the direction of its longitudinal axis) to be more easily pushed or pulled through the barrel portions 4, 6 by one hand (of a user) with less of chance of binding.

The outside surface of the shaft 11, and the inner surfaces 12 in each of the barrel portions 4, 6 may have any one of a variety of complementary shapes, that provide the keyed surfaces needed to prevent rotation of the first spoke 2 relative to the second spoke 3. In a preferred embodiment, the shaft 11 may be a polygonal cylinder, with its complementary shape formed on the inner surfaces 12 of the barrel portions 4, 6. The polygonal cylinder may be a triangular cylinder, a square or rectangle cylinder, a pentagonal cylinder, a hexagonal cylinder, heptagonal cylinder, octagonal cylinder, nonagonal cylinder, decagonal cylinder, and so on. The shape of inner surface 12 and that of its defined pin opening 9 may be described here as being complementary to the shape of the outside surface of the shaft 11 where the latter shape may extend to the bottom end of the shaft 11 as shown. In one embodiment, the shapes are maintained continuously along the entire length of the shaft 11 as shown FIG. 2, and along the entire length of each of the barrel portions 4, 6, to reduce the likelihood of binding, during the entire process of inserting the shaft 11 into the barrel portions 4, 6 through the pin openings 9 (and also removing the shaft 11.)

The number of sides of the polygon that is defined by a cross section of the inner surface 12, or by a cross section of the shaft 11 (where the cross section is cut along a horizontal plane), is related to the number of discrete angles or rotational positions that can be had between the first 2 and second spokes 3 (with the pin 8 inserted). In one embodiment, the number of positions equals the number of sides of the polygon minus one. For example, a heptagonal cylinder having seven sides allows for the spokes 2, 3 to be arranged at any one of six different angular positions. In another example, an octagonal cylinder having eight sides allows for seven different angular positions.

Proper alignment between the shaft 11 and the inner surface 12 of a barrel portion 4, 6 is needed to enable the pin 8 to be easily inserted into the barrel portions 4, 6. The shaft 11 and the inner surface 12 may be described as having essentially the same contour. If the shaft 11 is shaped as an octagonal cylinder, for example, the inner surface 12 should also be shaped as an octagonal cylinder, of essentially the same polygonal side lengths. In order to insert the shaft 11 of the pin 8 into the barrel portions 4, 6, the vertexes of the polygons defined by the inner surface 12 and those of the shaft 11 should be aligned. In one embodiment, there is a sufficient gap that is designed between a side of the polygon defined by the pin 8 and a complementary side of the polygon defined by the inner surface 12, so that the pin 8 can be inserted easily (by hand) into the barrel portions 4, 6 without requiring perfect alignment between the barrel portions 4, 6 and the shaft 11. This gap also governs the rotational play that is present between the first and second spokes 2, 3 mentioned above (once the pin 8 has been inserted). Once the pin 8 has been inserted into the pin openings 9 of the barrel portions 4, 6, rotational movement between the two spokes 2, 3 is limited to just the inherent play that is allowed by the designed gap.

In another embodiment, rather than being made up of only flat or straight faces, the keyed surfaces of the shaft 11 and the inner surfaces 12 in the barrel portions 4, 6 may have corresponding curved portions, e.g., each may be composed of only curved portions. (See e.g. FIG. 8, 9A-9D). A cross section (cut along a horizontal plane while the shaft 11 is vertical) of the shaft 11 having such a keyed surface may be shaped as a four-leaf clover, for example. In the case of a four-leaf clover, the first spoke 2 and the second spoke 3 may take on only three different rotational or angular positions relative to each other. In this embodiment, the number of positions may equal the number of leaves of the clover minus one. There may be at least three leaves in the clover.

In yet another embodiment, the cross section of the shaft 11 (taken along a horizontal plane while the shaft 11 is in a vertical orientation as shown in FIG. 2) and of the corresponding inner surfaces 12, may be shaped as a star with at least three points. A star with three points enables at least two different relative angular positions of the first and second spokes 2, 3. These embodiments may also require the inner surfaces 12 of the barrel portions 4, 6 to be aligned with each other before the pin 8 is inserted into them.

Figure 4:
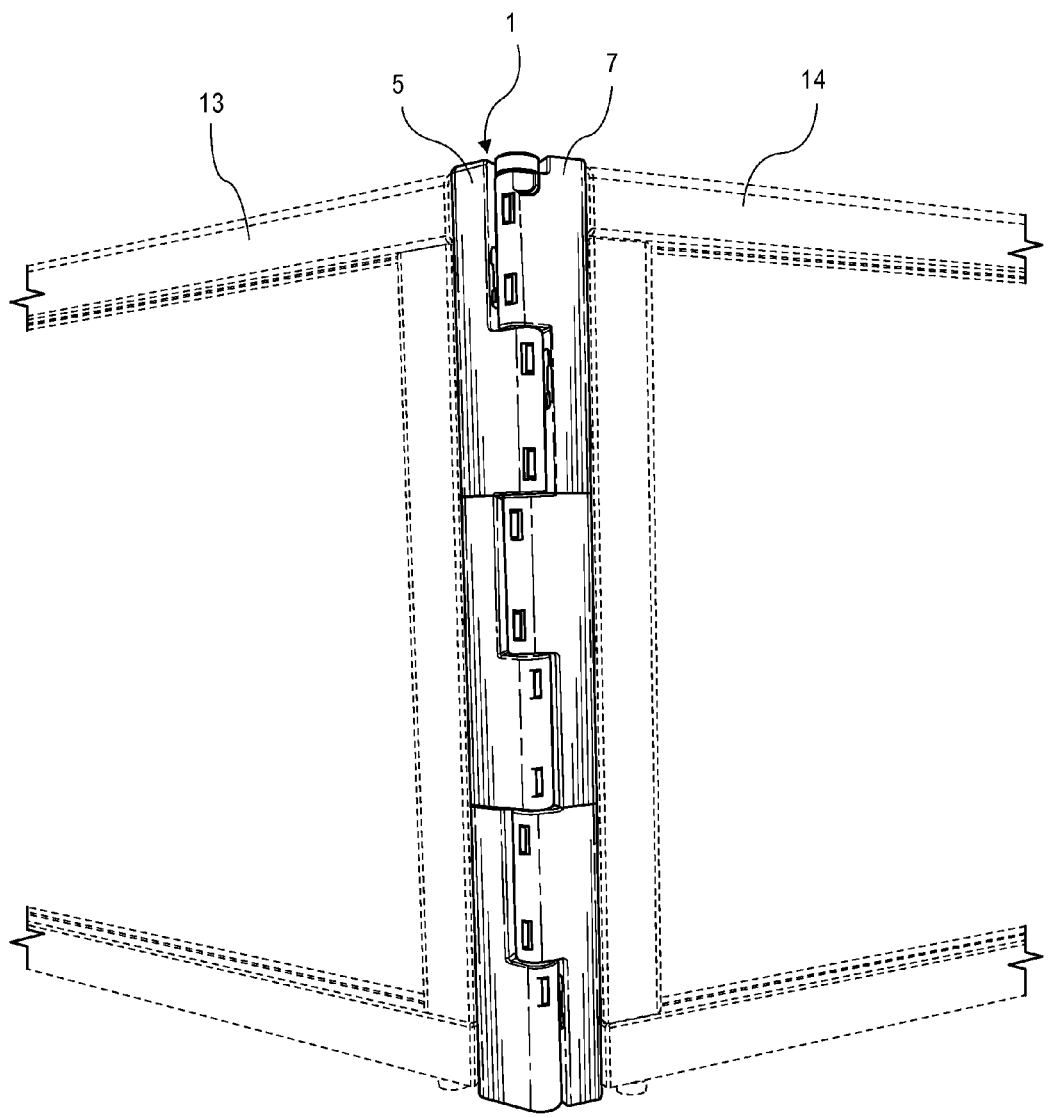
FIG. 4 shows a front view of the embodiment of FIG. 3 set to an angle of less than 180 degrees.

As shown in FIGS. 3 and 4, the support members 5, 7 of the first and second spokes 2, 3, respectively, may be connected to furniture pieces 13, 14, respectively. In one embodiment, a sliding lock mechanism as described below may be used to attach or connect the support member 5, 7 to its abutting furniture piece 13, 14, respectively. This is depicted in FIGS. 5-7.

Figure 5:
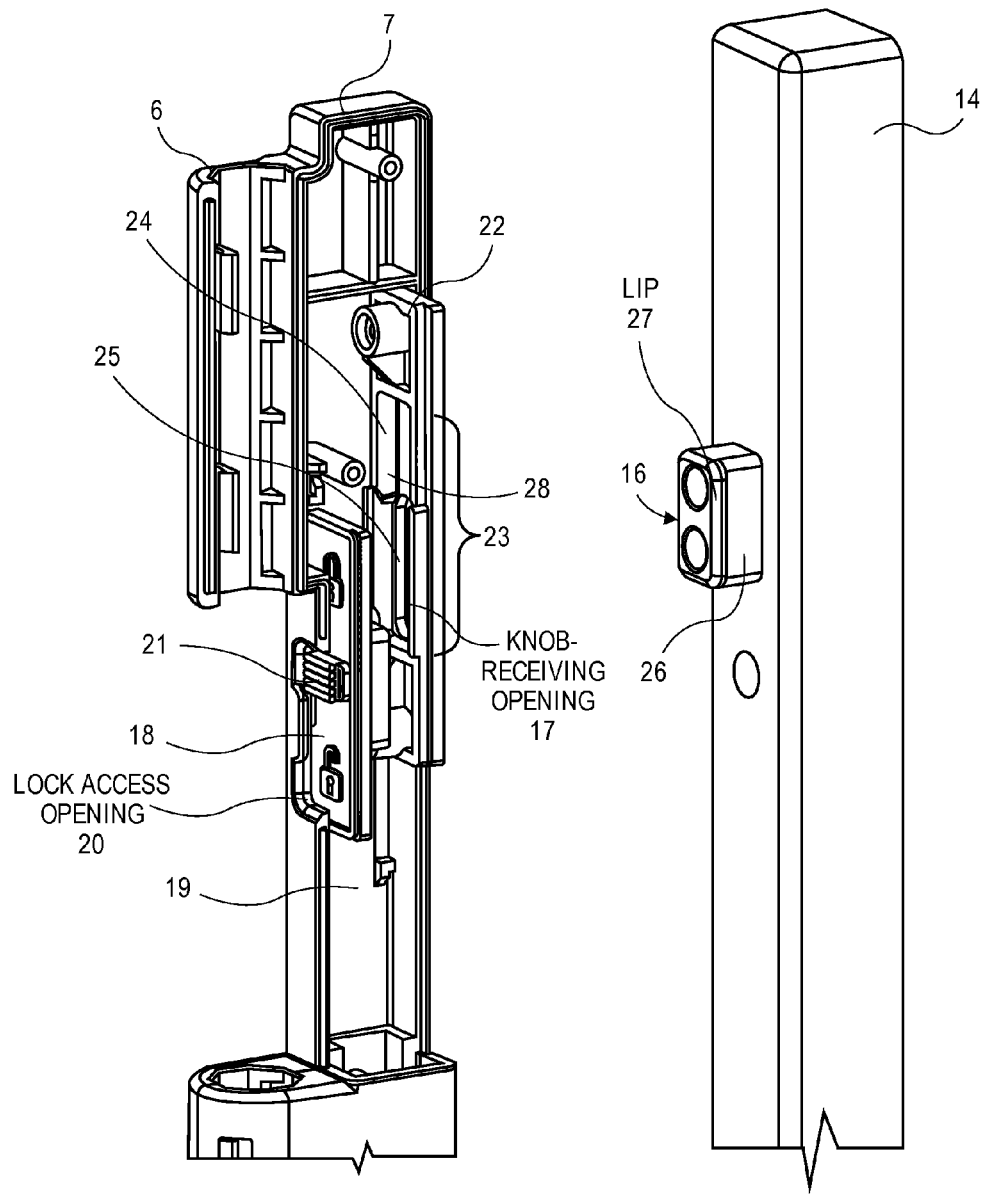
FIG. 5 shows a cross section view along the vertical plane of a sliding lock mechanism in an unlocked position that is disconnected from a knob of a furniture piece.
Figure 6:
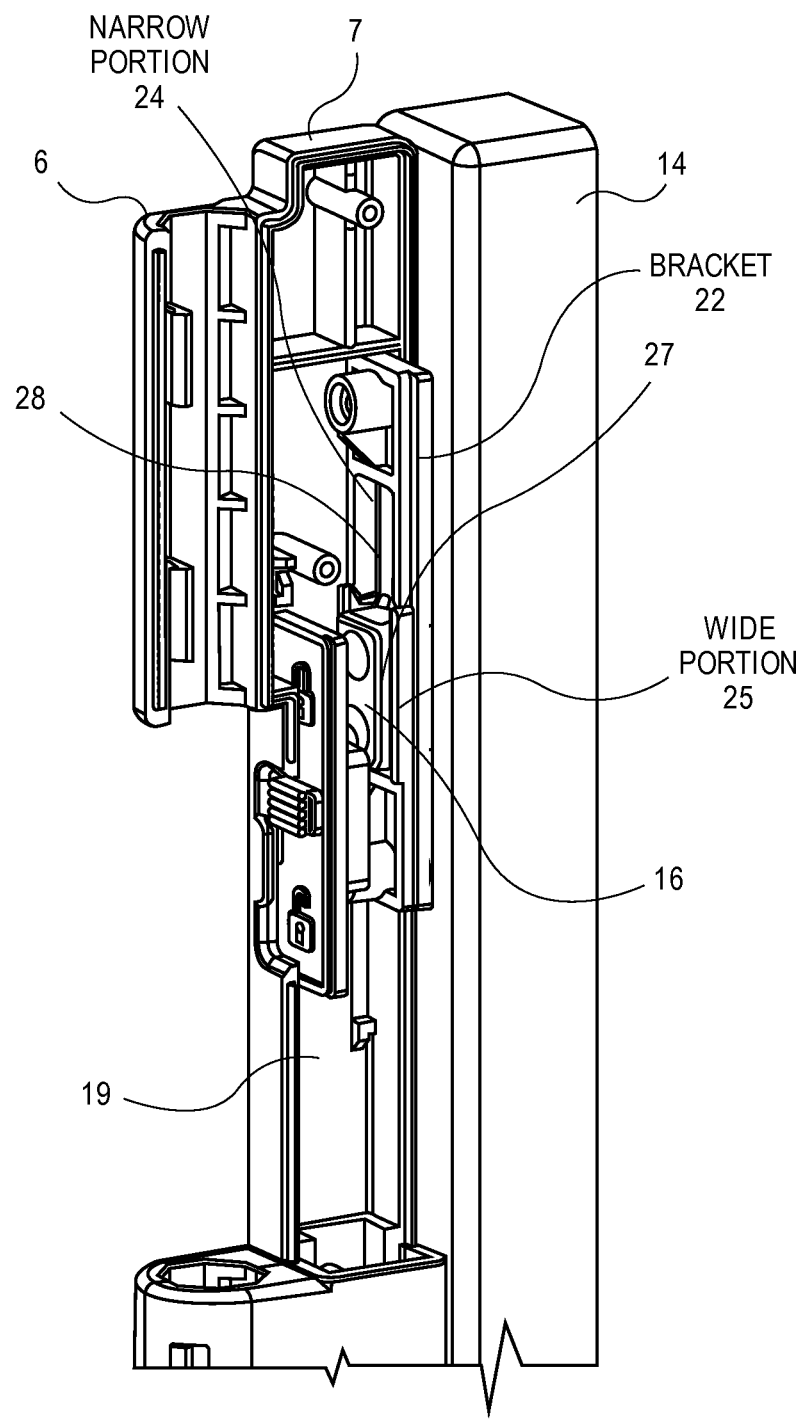
FIG. 6 shows a cross section view along the vertical plane of the sliding lock mechanism in an unlocked position that is connected with the knob of a furniture piece.
Figure 7:
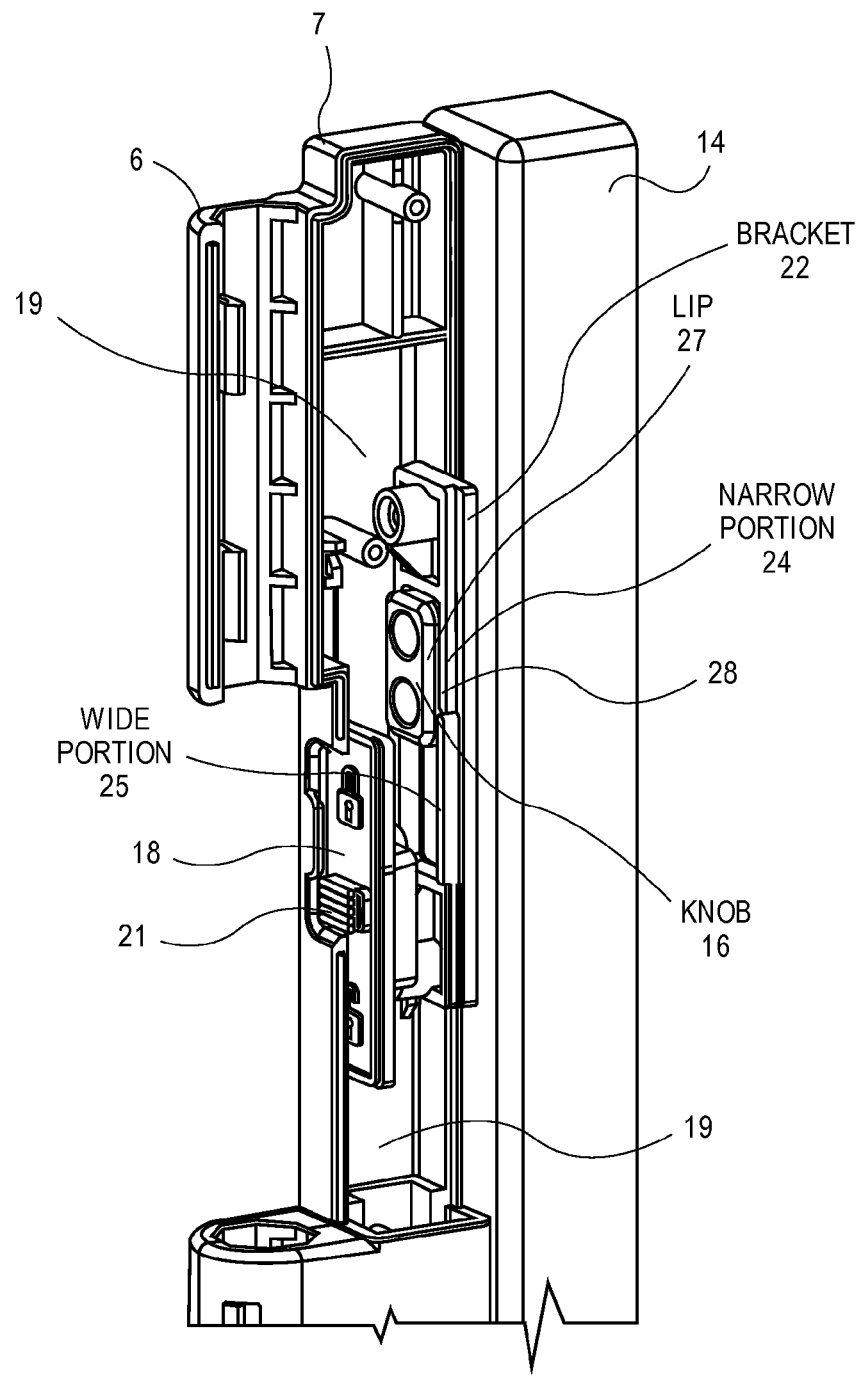
FIG. 7 shows a cross section view along the vertical plane of the sliding lock mechanism in a locked position and engaged with the knob of a furniture piece.
Figure 8:
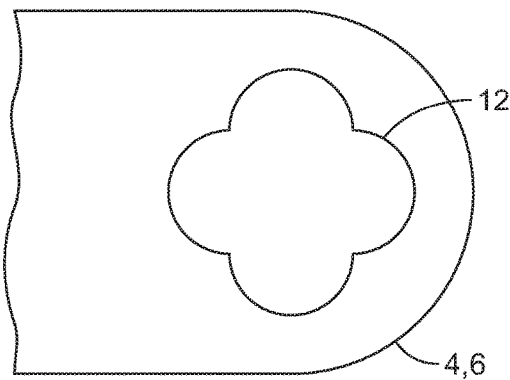
FIG. 8 is a partial cross-sectional top view of an alternative embodiment of the barrel portion.
Figure 9A:
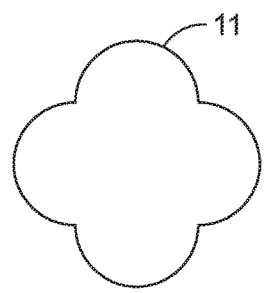
FIG. 9A is a cross-sectional top view of an alternative embodiment of the pin.
Figure 9B:
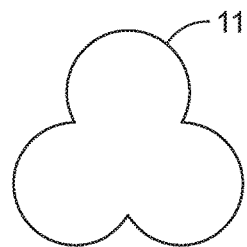
FIG. 9B is a cross-sectional top view of an alternative embodiment of the pin.
Figure 9C:
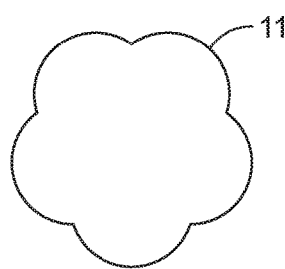
FIG. 9C is a cross-sectional top view of an alternative embodiment of the pin.
Figure 9D:
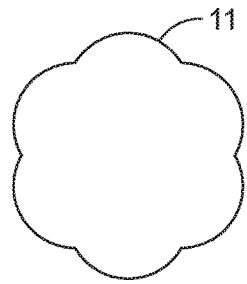
FIG. 9D is a cross-sectional top view of an alternative embodiment of the pin.

Referring to FIGS. 5-7, the sliding lock mechanism may include a knob 16, a knob-receiving opening 17 in the support member 7 (see also FIG. 2), and a sliding member 18 also in the support member 7. Note that the sliding member 18 of the support member 7 is not visible in FIG. 2, but the sliding member 18 that is in the support member 5 is visible. The following discussion refers to the sliding lock mechanism in the support member 7, in relation to the knob 16 that is on the furniture piece 14 as depicted in FIG. 5. But it should be appreciated that the same discussion may also be applied to a similar sliding lock mechanism that is in the other support member 5 (in relation to a knob 16 that would be on the other furniture piece 13.)

The furniture piece 14 may have one or more knobs 16 that are affixed to it, e.g., as a separate piece that is attached to an outside surface of the furniture piece 14, or as an integral part of the outside surface of the furniture piece 14. Each knob 16 may correspond to a respective knob-receiving opening 17 that is formed in the support member 7, e.g., through a wall of the support member 7 (see also FIG. 2). The knob 16 may have a body portion 26 that extends from a surface of the furniture piece 14, and a lip 27 that extends outwardly from a sidewall of the body portion 26. The knob 16 is sized so that it may be inserted into the knob-receiving opening 17. The knob-receiving opening 17 may be wide enough to allow insertion of the lip 27 (which extends wider than the body portion 26 of the knob 16.) The knob-receiving opening 17 may be positioned on a sidewall of the support member 7 that is opposite to where its barrel portion 6 is integrated or attached. Before the knob 16 is inserted into the knob-receiving opening 17, the sliding member 18 is placed in an unlocked position in order to provide more room so that the lip 27 of the knob 16 can pass into the support member 7. Once the lip 27 is inside the support member 7, the sliding member 18 may be manually moved into a locked position which restricts the lip 27 from coming out of the support member 7, thereby holding the knob 16 inside the support member 7, and as a result affixing the second spoke 3 to the furniture piece 14.

FIGS. 5 through 7 demonstrate an embodiment of the sliding lock mechanism. These figures show different states of the sliding lock mechanism, where one half of a housing of the (second spoke) support member 7 has been removed or cut away to reveal the internal workings of the lock mechanism. FIG. 5 shows the state in which the support member 7 is spaced apart from the furniture piece 14, thus not yet into position to engage the lock mechanism. FIG. 6 shows the support member 7 in position abutting the furniture piece 14, and in the unlocked state. FIG. 7 shows the locked state. Although not shown, the same sliding lock mechanism may be replicated on the (first spoke) support member 5 to connect the latter to another furniture piece 13 (see FIG. 4), to thereby connect the two pieces of furniture together.

The sliding lock mechanism includes a sliding member 18 that is positioned inside an interior cavity 19 of the support member 7 and is accessible through a lock access opening 20 in a wall of the support member 7. In one embodiment, the sliding member 18 may be moved along a longitudinal axis of the support member 7. The sliding member 18 may be moved manually (by the user), by being pushed through the lock access opening 20 in the support member 7. In this case, the lock access opening 20 is formed in a rear wall of the support member 7, which is opposite a front wall (in which the knob-receiving opening 17 is formed and that abuts the furniture piece); an alternative design may be to locate the lock access opening 20 in a sidewall of the support member 7. The lock access opening 20 as positioned on the support member 7 provides manual access to a user's finger, so that the user can insert her finger through the opening 20 until the finger comes into contact with the sliding member 18. The sliding member 18 may have a friction surface 21 that provides friction against the user's finger so that the sliding member 18 can be easily pushed longitudinally forward by the finger (until a stop is reached) to enable the sliding lock mechanism to be locked. The sliding member 18 can also be pushed rearward to enable the sliding mechanism to be unlocked. Both movements of the sliding member 18 can be easily achieved manually without the need for tools. The friction surface 21 may be a generally rough surface or may have one or more ridges, bumps and the like, as long as it provides sufficient friction for the user's finger.

The sliding member 18 may be integrated with or attached to a bracket 22. The bracket 22 is positioned inside the interior cavity 19 of the support member 7. The bracket 22 moves along the longitudinal axis of the support member 7 as the user manually pushes the sliding member 18 rearward and forward (or as shown in the drawings here, downward and upward) between its locked and unlocked positions, respectively. The bracket 22 may have an opening 23, which as shown in FIG. 5 may have a narrow portion 24 that opens to a wide portion 25. The wide portion 25 should be wide enough to receive or allow the lip 27 and the body portion 26 of the knob 16 to pass through it or clear it, as the support member 7 is moved in a sideways direction into position abutting the furniture piece 14, and then removed (in the sideways direction) from that position. To achieve the narrow portion 24, the bracket 22 may have a retaining edge 28 that protrudes inward (from an inner edge) by a sufficient amount that prevents the lip 27 from passing through it or clearing it, as explained.

When the sliding lock mechanism is placed in an unlocked position (FIG. 5), the wide portion 25 (of the opening 23 in the bracket 22) is aligned with the knob-receiving opening 17 of the support member 7. The knob 16 and its lip 27 may thus be inserted into the support member 7, past the wide portion 25 (as seen in FIG. 6.) The knob 16 is now within the interior cavity 19 of the support member 7, and the lip 27 is positioned behind the bracket 22. In this state, if the sliding member 18 is then placed into the locked position, by manually pushing the sliding member 18 (and hence the bracket 22) downward into the position as seen in FIG. 7, the knob 16 becomes locked (cannot be removed from the support member 7.) The bracket 22 is thus slid downward, while the lip 27 remains behind the bracket 22, so that the wide portion 25 (of the opening 23 in the bracket 22) moves below the knob-receiving opening 17 while the narrow portion 24 moves downward to become aligned with the knob-receiving opening 17. As a result, the retaining edge 28 of the bracket 22 (at the narrow portion 24 of the opening 23) at least partially surrounds and is close to abutting sidewall of the body portion 26 of the knob 16. In this state, the knob 16 cannot be pulled out of the cavity 19, because attempting to do so will cause the lip 27 to abut the retaining edge 28 of the bracket 22. In this manner, the support member 7 is locked in its abutting position against, or is attached to, the furniture piece 14.

To unlock the support member 7 (or detach it) from its position against the furniture piece 14, the user pushes the sliding member 18 in the reverse direction (in the example of FIGS. 5-7, upward) into the unlocked position, until the narrow portion 24 of the bracket 22 has moved above, and the wide portion 25 has become (again) aligned with the knob-receiving opening 17 in the support member 7. Because the lip 27 of the knob 16 can now clear the bracket 22 exiting through the wide portion 25 and the knob-receiving opening 17 (when the support member 7 is pulled sideways away from the furniture piece 14), the support member 7 is detached or unlocked from the furniture piece 14.

While FIGS. 5-7 show the sliding lock mechanism in the context of the support member 7 of a single, second spoke 3 being attached and detached from the furniture piece 14, more generally there may be more than one second spoke 3 whose support member 7 is connected to the furniture piece 14 (using a sliding lock mechanism.) For instance, in the case of FIG. 2, there are three, second spokes 3 (stacked to form a bank), but only the top and bottom spokes each have a sliding lock mechanism within their respective support members 7.

In another embodiment, which is in contrast to the embodiments shown in the figures here, the connector 1 may have more than two "vertical" banks of adjacent spokes that are connected to the same hub, i.e., through the same pin 8. In that case (not shown) the connector 1 can serve to attach more than two furniture pieces to each other. For example, referring to FIG. 2, assume here that the top and bottom ones of the three, second spokes 3 are attached to the same furniture piece, but that the middle one is omitted; a third second spoke 3 (not shown) is introduced that is attached to a third furniture piece, and that is positioned at a different angular position than that of the first spoke 2 and the third spoke 3. One or more of such a "third spoke" may thus be described as being "offset", i.e., at a different angle relative to the first spoke 2 and second spoke 3, so that a third furniture piece may be joined to two furniture pieces, through use of the same pin 8 passing through the barrel portions of all of the spokes.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A furniture connector comprising:
    a first spoke having a first spoke support member, the first spoke having a barrel portion extending from a barrel side of the first spoke support member and having a knob-receiving opening located on a knob-receiving side of the first spoke support member, wherein the knob-receiving side of the first spoke support member is opposite the barrel side of the first spoke support member;
    a second spoke having a second spoke support member, the second spoke having a barrel portion extending from a barrel side of the second spoke support member and having a knob-receiving opening located on a knob-receiving side of the second spoke support member, wherein the knob-receiving side of the second spoke support member is opposite the barrel side of the second spoke support member;
    a pin that joins the first spoke to the second spoke as it extends through a pin opening in the barrel portion of each spoke so as to maintain the first spoke barrel portion below the second spoke barrel portion, wherein the pin has a keyed outer surface that extends along a longitudinal axis of the pin and engages a keyed inner surface of each of the barrel portions so as to limit relative rotational movement of the first and second spokes about the longitudinal axis;
    a first furniture piece, the first furniture piece having a knob;
    a second furniture piece, the second furniture piece having a knob;
    a sliding locking mechanism formed on the first spoke support member and the sliding locking mechanism including a sliding member, the sliding locking mechanism engageable with the knob of the first furniture piece when the knob is positioned inside the first spoke support member through its knob-receiving opening, the sliding member of the first spoke is positioned inside an interior cavity of the first spoke support member such that it is accessible through a lock access opening that is formed through a wall of the first spoke on the barrel side of the first spoke support member when the first spoke is disengaged from the second spoke, and the sliding member of the first spoke is positioned such that the sliding member is adjacent to the barrel portion of the second spoke when the first spoke and the second spoke are engaged together with the pin; and
    a sliding locking mechanism formed on the second spoke support member and the sliding locking mechanism including a sliding member, the sliding locking mechanism engageable with the knob of the second furniture piece when the knob is positioned inside the second spoke support member through its knob-receiving opening, the sliding member of the second spoke is positioned inside an interior cavity of the second spoke support member such that it is accessible through a lock access opening that is formed through a wall of the second spoke on the barrel side of the second spoke support member when the second spoke is disengaged from the first spoke, and the sliding member of the second spoke is positioned such that the sliding member is adjacent to the barrel portion of the first spoke when the second spoke and the first spoke are engaged together with the pin.

2. The furniture connector of claim 1, wherein the pin openings of the first spoke barrel portion and the second spoke barrel portion are defined by the keyed inner surfaces of the barrel portions, respectively, which are shaped as polygonal cylinders.

3. The furniture connector of claim 2, wherein the keyed inner surfaces of the first spoke barrel portion and the second spoke barrel portion are shaped as one of the group consisting of: pentagonal cylinders, hexagonal cylinders, heptagonal cylinders, octagonal cylinders, nonagonal cylinders, and decagonal cylinders.

4. The furniture connector of claim 1, further comprising:
    another first spoke, having a support member and a barrel portion extending therefrom; and
    another second spoke, having a support member and a barrel portion extending therefrom,
    wherein the first spoke support member is attached to the support member of said another first spoke, and the second spoke support member is attached to the support member of said another second spoke, and
    wherein the pin joins said another first spoke to said another second spoke as it extends through a pin opening in the barrel portion of each spoke so as to maintain the barrel portion of said another first spoke below the barrel portion of said another second spoke.

5. The furniture connector of claim 4, wherein the first spoke, said another first spoke, the second spoke, and said another second spoke are arranged so that their barrel portions are aligned with and alternate along the longitudinal axis of the pin.

6. The furniture connector of claim 1, wherein the keyed outer surface of the pin, and the keyed inner surfaces of the first spoke barrel portion and the second spoke barrel portion, are shaped as curved cylinders.

7. The furniture connector of claim 6, wherein a cross section of the curved cylinders is shaped as one of the group consisting of: three leaf clover, four leaf clover, five leaf clover, and six leaf clover.

8. The furniture connector of claim 1, wherein the sliding lock mechanisms of each of the first spoke and the second spoke comprise:
    a bracket with an opening formed therein, wherein the opening includes a wide portion and a narrow portion.

9. The furniture connector of claim 8, wherein the bracket has a retaining edge that defines the narrow portion and that extends inward into the opening.

10. The furniture connector of claim 9, wherein the sliding member is attached to or integrated with the bracket.

11. The furniture connector of claim 10, wherein the bracket of the first spoke is located entirely within the first spoke support member; and
    wherein the bracket of the second spoke is located entirely within the second spoke support member.

12. The furniture connector of claim 8, wherein the knob of the first furniture piece and the second furniture piece has a body portion, and a lip that extends outwardly of a sidewall of the body portion, and wherein the lip of the knob does not pass through the narrow portion of the opening in the bracket, but does pass through the wide portion.

13. The furniture connector of claim 8, wherein a) the wide portion of the opening in the bracket is aligned with the knob-receiving opening in the support member, when the sliding member is placed in an unlocked position, and b) the narrow portion of the opening in the bracket is aligned with the knob-receiving opening in the support member, when the sliding member is placed in a locked position.

14. The furniture connector of claim 1, wherein the first spoke and the second spoke each comprise two half shells.

15. The furniture connector of claim 1, wherein the second spoke barrel portion has a notched portion at its top end in which a pinhead of the pin rests flush with a top end of the second spoke.

16. A furniture connector comprising:
    a first spoke including a first spoke support member, the first spoke having a barrel portion extending from a barrel side of the first spoke support member and having knob-receiving opening on a knob-receiving side of the first spoke support member, wherein the knob-receiving side of the first spoke support member is opposite the barrel side of the first spoke support member;
    a second spoke including a second spoke support member, the second spoke having a barrel portion extending from a barrel side of the second spoke support member and having a knob-receiving opening on a knob-receiving side of the second spoke support member, wherein the knob-receiving side of the second spoke support member is opposite the barrel side of the second spoke support member;
    a pin that joins the first spoke to the second spoke as it extends through a pin opening in the barrel portion of each spoke so as to maintain the first spoke barrel portion below the second spoke barrel portion,
    a sliding locking mechanism formed on the first spoke support member, the sliding locking mechanism having a sliding member positioned inside an interior cavity of the first spoke support member such that the sliding member is accessible when the first spoke is disengaged from the second spoke through a lock access opening that is formed on the barrel side of the first spoke support member, and the sliding member of the first spoke being positioned such that the sliding member is adjacent the barrel portion of the second spoke when the first spoke and the second spoke are engaged together with the pin; and
    a sliding locking mechanism formed on the second spoke support member, the sliding locking mechanism having a sliding member positioned inside an interior cavity of the second spoke support member such that the sliding member is accessible when the second spoke is disengaged from the first spoke through a lock access opening that is formed on the barrel side of the second spoke support member, and the sliding member of the second spoke being positioned such that the sliding member is adjacent the barrel portion of the first spoke when the second spoke and the first spoke are engaged together with the pin.

17. The furniture connector of claim 16, wherein the pin has a keyed outer surface that extends along a longitudinal axis of the pin and engages a keyed inner surface of each of the barrel portions so as to limit relative rotational movement of the first and second spokes about the longitudinal axis.

18. The furniture connector of claim 16, further comprising:
    another first spoke, having a support member and a barrel portion extending therefrom; and
    another second spoke, having a support member and a barrel portion extending therefrom,
    wherein the first spoke support member is attached to the support member of said another first spoke, and the second spoke support member is attached to the support member of said another second spoke, and
    wherein the pin joins said another first spoke to said another second spoke as it extends through a pin opening in the barrel portion of each spoke so as to maintain the barrel portion of said another first spoke below the barrel portion of said another second spoke.

19. The furniture connector of claim 18, wherein the first spoke, said another first spoke, the second spoke, and said another second spoke are arranged so that their barrel portions are aligned with and alternate along the longitudinal axis of the pin.

20. A furniture connector comprising:
    a first spoke including a first spoke support member, the first spoke having a barrel portion extending from a barrel side of the first spoke support member and having a knob-receiving opening on a knob-receiving side of the first spoke support member, wherein the knob-receiving side of the first spoke support member is opposite the barrel side of the first spoke support member;
    a second spoke including a second spoke support member, the second spoke having a barrel portion extending from a barrel side of the second spoke support member and having a knob-receiving opening on a knob-receiving side of the second spoke support member, wherein the knob-receiving side of the second spoke support member is opposite the barrel side of the second spoke support member;

a pin that joins the first spoke to the second spoke as it extends through a pin opening in the barrel portion of each spoke so as to maintain the first spoke barrel portion below the second spoke barrel portion, a first furniture piece, the first furniture piece having a knob, the knob of the first furniture piece having a body portion, and a lip that extends outwardly of a sidewall of the body portion;

a second furniture piece, the second furniture piece having a knob, the knob of the second furniture piece having a body portion, and a lip that extends outwardly of a sidewall of the body portion;

a sliding locking mechanism formed on the first spoke support member, the sliding locking mechanism having a sliding member positioned inside an interior cavity of the first spoke support member such that the sliding member is accessible when the first spoke is disengaged from the second spoke through a lock access opening that is formed on the barrel side of the first spoke support member, and the sliding member of the first spoke being positioned such that the sliding member is adjacent the barrel portion of the second spoke when the first spoke and the second spoke are engaged together with the pin;

a sliding locking mechanism formed on the second spoke support member, the sliding locking mechanism having a sliding member positioned inside an interior cavity of the second spoke support member such that the sliding member is accessible when the second spoke is disengaged from the first spoke through a lock access opening that is formed on the barrel side of the second spoke support member, and the sliding member of the second spoke being positioned such that the sliding member is adjacent the barrel portion of the first spoke when the second spoke and the first spoke are engaged together with the pin;

wherein the sliding locking mechanism of the first spoke member is configured to engage the knob of the first furniture piece when the knob is positioned inside the first spoke support member through its knob-receiving opening;

wherein the sliding locking mechanism of the second spoke member is configured to engage the knob of the second furniture piece when the knob is positioned inside the second spoke support member through its knob-receiving opening;

wherein the sliding locking mechanism of the first spoke further comprises a bracket attached to or integrated with the sliding member, the bracket having an opening including a wide portion and a narrow portion and wherein the lip of the knob does not pass through the narrow portion of the opening in the bracket, but does pass through the wide portion;

wherein the sliding locking mechanism of the second spoke further comprises a bracket attached to or integrated with the sliding member, the bracket having an opening including a wide portion and a narrow portion and wherein the lip of the knob does not pass through the narrow portion of the opening in the bracket, but does pass through the wide portion;

wherein the bracket of the first spoke is located entirely within the first spoke support member; and wherein the bracket of the second spoke is located entirely within the second spoke support member.

\* \* \* \* \*